United States Patent Office 3,132,456
Patented May 12, 1964

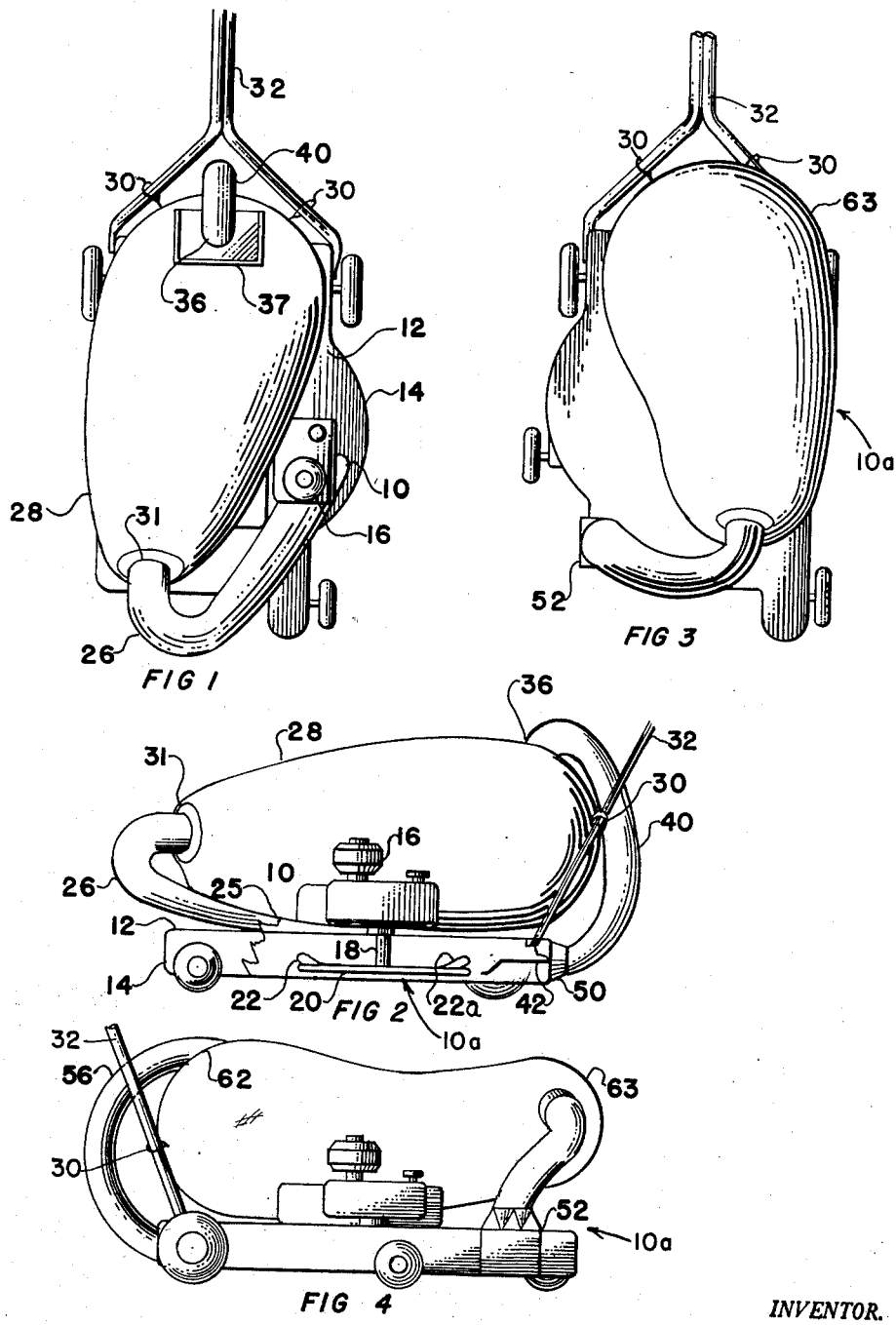

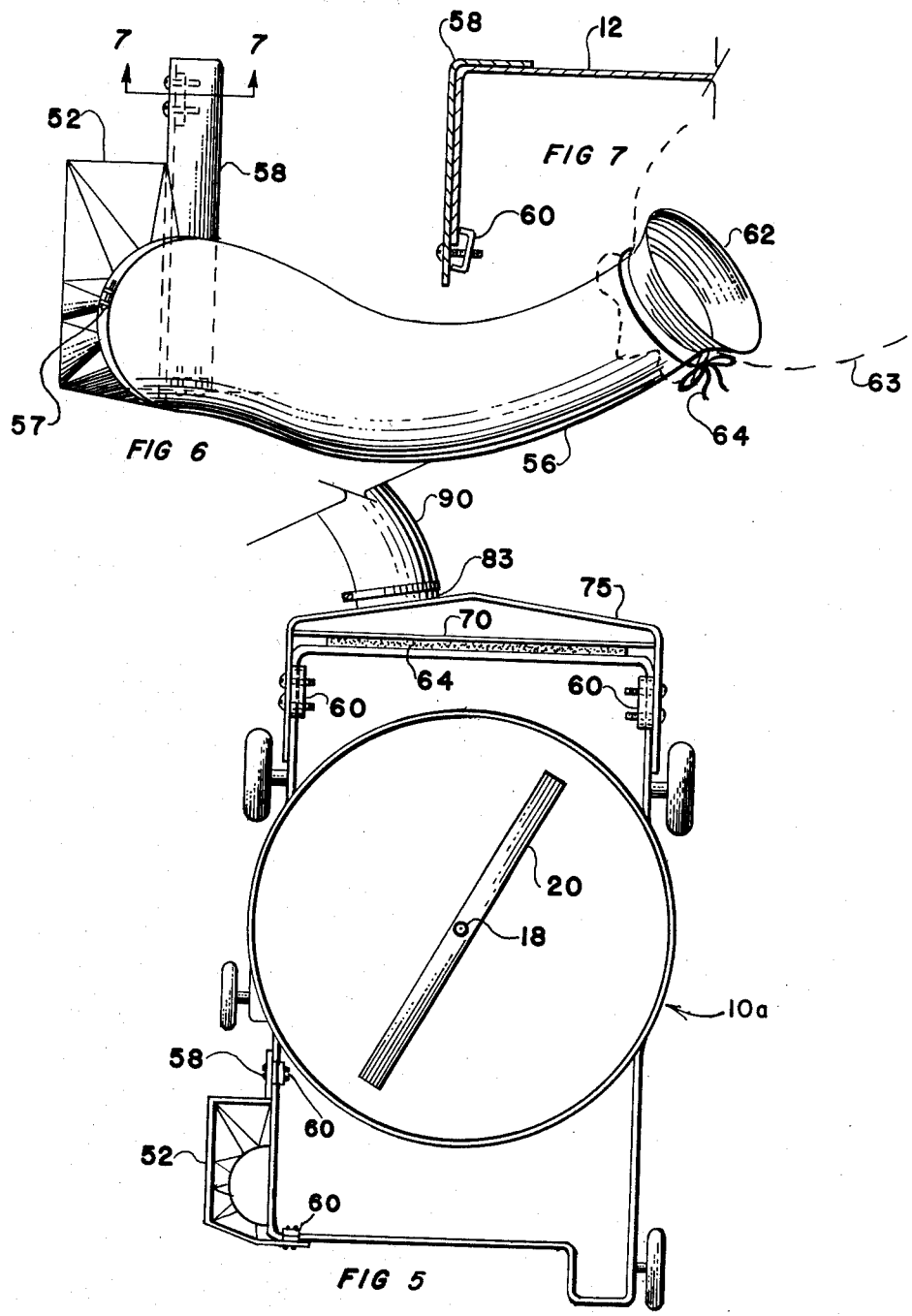

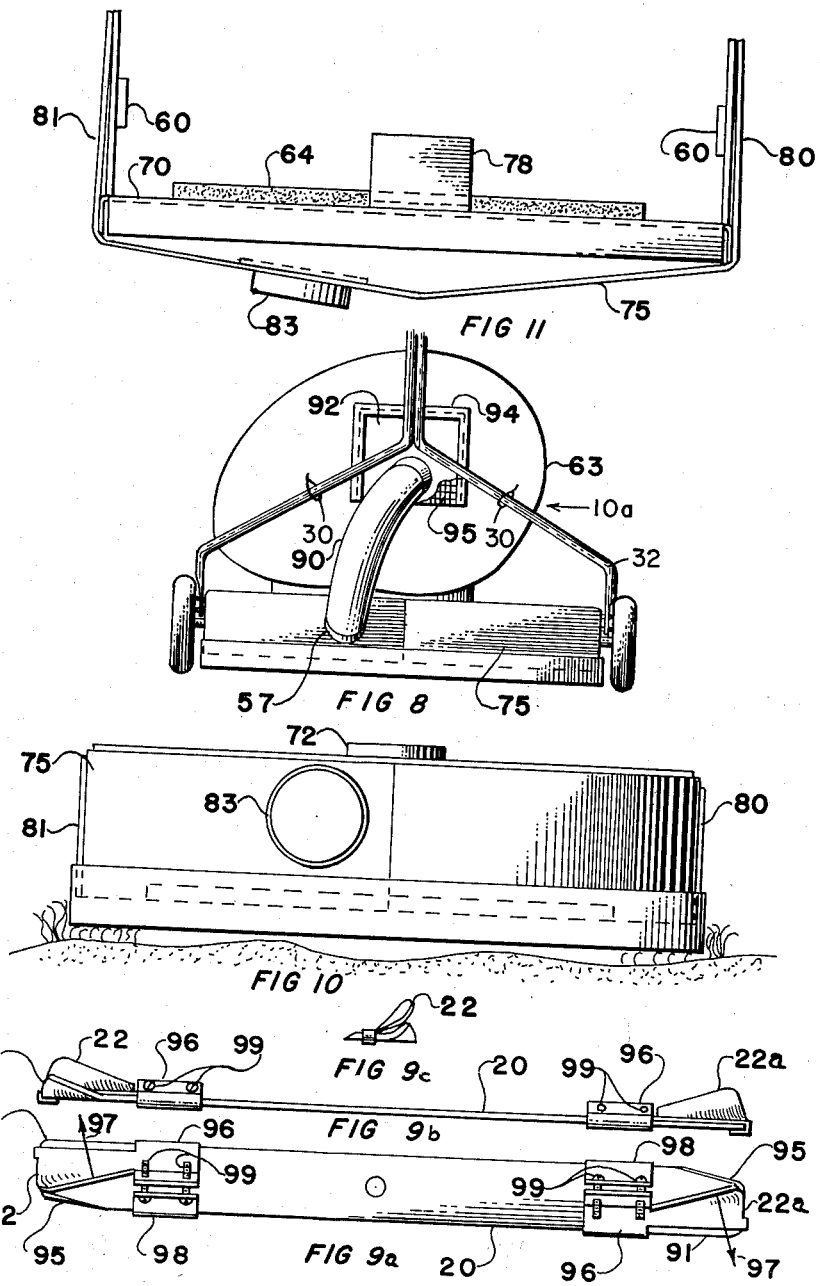

3,132,456
ATTACHABLE LEAF COLLECTING MEANS FOR ROTARY LAWN MOWER
Richard Konrad, 32 Martens Ave., Valley Stream, N.Y.
Filed June 20, 1963, Ser. No. 289,449
4 Claims. (Cl. 56—25.4)

This application is a continuation-in-part of my co-pending application Serial No. 26,275, filed May 2, 1960, now abandoned.

The present invention relates to a collection attachment for a rotary lawn mower wherein the horizontally aligned cutter blade is formed with an impeller configuration to move the leaves, cut grass, and other loose particles into a collecter bag.

The present invention envisages a rotary lawn cutter having improved suction and impeller means for gathering up material partly embedded in topsoil normally not collected by existing rotary mowers of the same power and dimensions, and to store cuttings in a bag unit more conveniently located than in corresponding mower-collector units. It is further contemplated to provide the benefits and advantages of the present invention to existing rotary mowers having standard cutter blades and having no collector means, by providing in kit form the novel features of the present invention.

Despite the effectiveness and popularity of conventional rotary cutters, various defects and drawbacks exist that have not been corrected heretofore. Firstly, placing the outlet port to one side of the cutter housing necessarily increases the width of the unit, which requires that a wider wheel base be used, or in the alternative, requiring that the collector chute project laterally beyond the line of the wheel base, whereby close trimming of a lawn near bushes, trees or fences is made difficult. The use of a side-mounted collection container attached to the chute further interferes with the maneuverability of the machine. For example, walks or passages narrower than the width of the mower and side-mounted collector cannot be cleaned.

Secondly, placing the collector bag "off center," to one side, or behind the guide handle of the unit, as is customary, can disturb the center of gravity noticeably so where masses of soggy leaves or grass cuttings are to be stored. This could tilt the plane of the cutting blade, causing an uneven cut in the grass.

In view of the large numbers of standard rotary mowers equipped with an outlet port in the casing, it becomes readily feasible to adapt the significant improvements of the present invention to these existing units by providing (a) means to convert the cutter into an impeller, (b) means to provide access from the outlet port to a collector bag, and (c) a collector positionable above the casing which is substantially at the center of gravity.

It is therefore an object of the present invention to provide a rotary lawn mower having improved cutting and grass collecting characteristics.

It is a further object of the present invention to provide improved air agitation means associated with a cutter-impeller to permit fallen tree leaves, loose twig material, etc., to be readily gathered into a receptacle.

It is yet another object of the present invention to provide a collector bag adapted to be mounted at a point substantially at the center of gravity of the device.

Still another object of the present invention is to provide means for incorporating the principal advantages of the present invention on existing mowers of the rotary type not having collecting means.

These and other objects and advantages of the present invention will, in part, be pointed out with particularity and will, in part, be apparent from the following description, taken in conjunction with the appended drawing. In the various figures of the drawing, like reference characters designate like parts.

In the drawing:

FIG. 1 is a top view of a rotary lawn mower having incorporated therein the present invention.

FIG. 2 is a side elevation of the mower shown in FIG. 1.

FIG. 3 is a top view of a conventional lawn mower of the rotary type having attached thereto the present invention.

FIG. 4 is a side elevation of the lawn mower and attachments shown in FIG. 3.

FIG. 5 is a bottom view looking upward at the lawn mower and attachments shown in FIG. 3.

FIG. 6 is a top view shown in a larger scale of the outlet attachments shown in FIG. 3.

FIG. 7 is an enlarged section taken along line 7—7 of FIG. 6.

FIG. 8 is a rear perspective view of a lawn mower fitted with the present invention.

FIGS. 9a, 9b and 9c show top, front and end views respectively of an attachment for a cutting blade.

FIGS. 10 and 11 are rear and top views respectively of an inlet attachment shown in FIG. 3.

Referring now more particularly to the drawings, there is shown in FIGS. 1 and 2 an embodiment of the present invention wherein the device is incorporated into a rotary lawn mower during the manufacturing process, whereas FIGS. 3–11 show the device in kit form, adapted to be attached to existing lawn mowers.

FIGS. 1 and 2 illustrate a rotary lawn mower of the type having a casing 10 open at the bottom, said casing being defined by a horizontal top wall 12 and dependent side wall or skirt 14. Motor 16 is mounted above top wall 12 and has drive shaft 18 journaled in said top wall, with cutter blade 20 attached at the lower extremity of said shaft (FIG. 2).

Cutter 20 is given an impeller action by flange segments 22 and 22a, mounted at the extremities of the trailing edge of said cutter. This impeller action forces grass cuttings upward and outward by vacuum and centrifugal forces, against outlet port 25, whence the grass cuttings travel through duct 26 to collector bag 28.

It will be noted that this bag is disposed substantially at the central point of the casing, at the center of gravity, as distinguished from conventional units which place this bag to one side of the guide handle. Bag supports 30 may conveniently be positioned on the upper part of the housing and attached to guide handle 32 of the unit.

Duct 26 is detachably connected to bag 28 at bag opening 31. A second opening 36 is formed at the aft end of bag 28, to which is detachably fastened inlet duct 40 communicating to the interior of the cutter unit. A removable screen 37 is disposed at this point, as shown in FIG. 1. Inlet duct 40 communicates to the interior of the cutter unit and a baffle plate 42 directs the flow of air from a point below the plane of rotation of cutter 20, as shown in FIG. 2.

It will thus be apparent that a continuous circulation of air by the action of the combined cutter-impeller unit will force air through conduit 26 to bag 28, thence through conduit 40 to inlet port 50, thence back into the casing at a point below said cutter-impeller. It is therefore, unnecessary to provide air escape means associated with bag 28, which in conventional devices comprise air escape ports or require that the bag be made of flimsy material to facilitate escape of air. Bag 28 can, therefore, be made of sturdy durable cloth, or of inexpensive plastic sheeting such as one mil thick polyethylene which could be disposed of after it is filled.

In operation, the jet of air entering the casing through inlet port 50 will effectively dislodge bits of matter loosely embedded in the topsoil which would ordinarily resist the removal action of standard impellers.

The foregoing description has been primarily directed to mowers in which the various features of this invention are incorporated during manufacturing. It is preferred that the opening from the housing to the intake duct be provided on the upper edge of the housing. This arrangement is preferred since it provides a more direct run from the cutting blade to the container. The suction tube and its associated suction throat may be directly incorporated into the lower housing.

It is contemplated that the present invention also be adapted to existing rotary mowers of the type provided with an outlet port in the casing skirt, which is the conventional construction. To accomplish this, the essential units of the present invention are provided, as a kit, namely, attachments to convert the cutter to an impeller, means to attach a conduit to the outlet port, a collector bag and means for positioning this on the casing, an inlet duct, and means to secure this duct to the casing skirt. These will be described in further detail hereinafter.

Reference is now made to FIG. 5 where there is shown a bottom view of a conventional rotary type motor having attached thereto the apparatus of this invention. The mower is indicated generally by the reference numeral 10a. Attached to the outlet port of the mower, there is provided a rectangular housing 52, which is formed of sheet meal, or may in the alternative be formed of resin impregnated fiberboard or other like suitable material. The housing is truncated so as to mate with a flexible tube 56. The tube may be formed of Fiberglas, canvas, nylon, plastic, or other material of like characteristics. A conventional helical wire support is preferably provided inside the tube to keep it open. A clamp 57 clamps one end of the tube to housing 52. Housing 52 extends from an L-shaped mounting plate 58 which seats itself on the mower housing and is secured thereto by means of clamps 60. This clamping arrangement is shown clearly in FIG. 7. The other end of tube 56 terminates in a flared end 62 formed of metal or plastic. Bag 63 may be secured over the flared end 62 by means of drawstring 64.

At the rear of mower 50, there is attached, by means of clamps 60, the inlet duct shown in FIGS. 8, 10 and 11. The duct is provided with a plate 70 which fits in back of the mower housing. Since conventional mowers are frequently made employing a cast housing having decorative recesses and grooved patterns, a resilient gasket 64 is provided which sits between the back of the mower and plate 70. A second plate 75 is arranged in spaced relationship to plate 70. The space between the two plates is enclosed on the bottom end by bent over portions of plate 75. Extending from plate 70, there is provided a bracket member 78. A pair of side skirt members 80 and 81 extend forwardly from plate 75. As will be appreciated from FIG. 7, clamps 60 are attached to side skirts 80 and 81 to provide means for securing the attachment to the mower. Neck 83 extends from plate 75 and communicates with the chamber existing between plates 70 and 75. Hose 90 extends from neck 83 to plate 92 (see FIG. 8). The plate 92 is adapted to slide in guides 94 secured to bag 63. A removable screen 95 may be secured under plate 92 within guides 94.

Referring now to FIGS. 9a, 9b and 9c, there is shown a blade attachment for the conventional mower blade. The conventional mower blade 20 consists of a steel member approximately 2 inches in width and one-eighth inch thick having beveled portions on the extremities forming the cutting edges 91. It is conventional to turn up the corners 95, behind the cutting edges, to provide lift to the grass and facilitate the cutting thereof. The device disclosed herein consists of a pair of members 96 which are clamped to the end of the cutting blade to act as aerodynamic members to provide lift to the grass and centrifugal action, as shown by arrows 97. The members 96 are arranged so that they act in the direction away from the center of rotation thus facilitating the forcing outward of leaves and cuttings. The members are attached to the blades 20 by means of a U-shaped clamp 98 secured by a pair of screws 99. Members 96 can be tapped to receive the screws 99; or auxiliary nuts, provided with suitable locking washers, may be employed.

Having thus disclosed by invention in compliance with the statutes, I wish it understood that various modifications and changes may be made without departing from the spirit of the invention.

What is claimed is:
1. A refuse collection kit adapted to be attached to a rotary power mower of the type having an engine provided with a vertical shaft directly coupled to a horizontally positioned cutting blade, an air inlet port at least partly below the plane of said cutting blade, and a side discharge port for cuttings, said kit comprising:
   a flexible first conduit communicating with said port, said first conduit having a pair of open ends;
   clamping means to attach one said end of said first conduit to said port;
   a non-rigid bag having an intake port and an outlet port;
   clamping means to connect said bag intake port to the other said end of said first conduit;
   a second conduit means communicating with said air inlet port, said second conduit having a pair of open ends;
   clamping means to connect one end of said second conduit to said air inlet port;
   clamping means to connect the other end of said second conduit to a bag outlet port; and
   a hanger means to support said bag over the mower engine.
2. The apparatus of claim 1 including means for removably securing a screen between said second conduit means and said bag.
3. The apparatus of claim 1 wherein said collector bag is formed of material substantially impervious to air.
4. The apparatus of claim 1 wherein said bag is disposable.

References Cited in the file of this patent
UNITED STATES PATENTS

| | | |
|---|---|---|
| 1,383,455 | Farnsworth | July 5, 1921 |
| 2,762,184 | Farrer | Sept. 11, 1956 |
| 2,779,146 | Mitchell et al. | Jan. 29, 1957 |
| 2,924,059 | Beeston | Feb. 9, 1960 |
| 2,973,614 | Horner et al. | Mar. 7, 1961 |